(12) United States Patent
Blackburn et al.

(10) Patent No.: US 8,990,821 B2
(45) Date of Patent: *Mar. 24, 2015

(54) TASK DISPATCHING BASED ON COMPOSITE QUEUE SIZE AND UPPER AND LOWER COMPARE VALUES

(75) Inventors: Robert A. Blackburn, Hopewell Junction, NY (US); Robert O. Dryfoos, Hopewell Junction, NY (US); Mark Gambino, Brewster, NY (US); Michael J. Shershin, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 922 days.

This patent is subject to a terminal disclaimer.

(21) Appl. No.: 12/569,524

(22) Filed: Sep. 29, 2009

(65) Prior Publication Data

US 2011/0078700 A1    Mar. 31, 2011

(51) Int. Cl.
G06F 9/46 (2006.01)
G06F 9/50 (2006.01)

(52) U.S. Cl.
CPC .................................. *G06F 9/505* (2013.01)
USPC ......................................... 718/102; 718/104

(58) Field of Classification Search
USPC ....................................................... 718/102
See application file for complete search history.

(56) References Cited

U.S. PATENT DOCUMENTS

| 4,631,674 A * | 12/1986 | Blandy ........................ 718/105 |
| 6,128,642 A | 10/2000 | Doraswamy et al. |
| 6,993,602 B2 * | 1/2006 | Merrill et al. .................... 710/54 |
| 7,028,297 B2 * | 4/2006 | Horn et al. ..................... 718/100 |
| 8,036,124 B1 * | 10/2011 | Motwani ........................ 370/235 |
| 2004/0037302 A1 * | 2/2004 | Varma et al. .................. 370/412 |
| 2009/0234908 A1 * | 9/2009 | Reyhner et al. ............... 709/203 |

OTHER PUBLICATIONS

Non-Final Office Action dated May 15, 2012 received for U.S. Appl. No. 12/569,554.

* cited by examiner

*Primary Examiner* — Abdullah Al Kawsar
*Assistant Examiner* — Wissam Rashid
(74) *Attorney, Agent, or Firm* — Fleit Gibbons Gutman Bongini & Bianco PL; Jeffrey Giunta

(57) ABSTRACT

A method and system is disclosed for dispatching tasks to multiple processors that all share a shared memory. A composite queue size for multiple work queues each having an associated processor is determined. A queue availability flag is stored in shared memory for each processor work queue and is set based upon the composite queue size and the size of the work queue for that processor. Each queue availability flag indicates availability or unavailability of the work queue to accept new tasks. A task is placed in a selected work queue based on that work queue having an associated queue availability flag indicating availability to accept new tasks. The data associated with task dispatching is maintained so as to increase the likelihood that valid copies of the data remain present in each processor's local cache without requiring updating do to their being changed by other processors.

15 Claims, 5 Drawing Sheets

TASK DISPATCHING BASED ON COMPOSITE QUEUE SIZE AND UPPER AND LOWER COMPARE VALUES

FIELD OF THE INVENTION

The present invention generally relates to multiple processor computing systems, and more particularly relates to processing task dispatching algorithms applied to multiple processor computing systems.

BACKGROUND OF THE INVENTION

Recent central processing unit (CPU) development efforts have increased the processing speed of CPUs more rapidly than the access speed for main memory. As an example, the CPU clock speed of some systems have more than doubled compared to earlier versions, but the speed of available memory to be used by both versions is relatively the same. In a common server architecture, each of multiple CPUs have its own level 1 (L1) memory cache, but lower level memory caches, such as level 2 (L2) and level 3 (L3) memory caches (if present) are shared by multiple CPUs, as is the main memory. As a result, the number of CPU cycles required to access data that does not reside in the CPU's primary (L1) memory cache has gone up significantly. Sharing data among multiple CPUs on a server that all share memory where multiple CPUs update the contents of the shared memory, such as in a symmetric multiprocessing (SMP) server, has an increasingly negative impact on performance as the speed difference between CPUs and main memory increases. This impact is intensified when shared data is updated frequently by several of the multiple CPUs so as to induce memory cache thrashing in those CPUs.

Conventional SMP servers include an operating system (OS) task dispatcher or scheduler that distributes work to the CPUs using one of several algorithms. One candidate algorithm is referred to as a "shared work queue," which is the most efficient approach according to pure mathematical queuing theory. In a shared work queue, all work of equal priority goes on a single work queue and whenever a CPU becomes available, that CPU takes the next item of work from that queue. The overhead and time delays caused by the access control mechanisms of the shared memory structure of an SMP server, however, can become significant in systems with many processors that share and update information in that single work queue.

Another candidate task dispatching algorithm is referred to as a "least queue" algorithm. A least queue algorithm assigns a work queue to each CPU and newly created items of work are added to the queue of the CPU with the smallest queue size. Various methods, including round-robin distribution, are used to handle multiple CPUs that have the lowest queue size. The least queue algorithm has a characteristic that the current queue size of each CPU is examined when each item of work is created and dispatched. In an example with 16 CPUs, each of these 16 CPUs has its own work queue that is frequently being updated by, for example, items being added to a work queue by any CPU and an item being removed from a queue by the CPU that owns that queue. In an example where CPU number 5 of a multiple CPU system has to select a CPU to which to queue an item of work, it is unlikely that the queue size information for the other 15 CPUs is in the L1 memory cache for CPU 5, and therefore CPU 5 is required to data fetch all of those values, which is a very time expensive process to perform each time the task dispatcher code is executed. The processing inefficiencies associated with updating the L1 cache of all CPUs grows with the number of CPUs that use a common shared memory.

Therefore, the efficiency of multiple processor computing systems is able to be improved by a more efficient task dispatching algorithm that reduces the frequency of updating data in shared memory accessed by multiple processors.

SUMMARY OF THE INVENTION

In one embodiment, a method for dispatching tasks to processors sharing a shared memory system within a multiple processor system includes determining, by a first processor within a plurality of processors, a composite queue size for a plurality of work queues, each work queue within the plurality of work queues being associated with a respective processor within the plurality of processors. Each of the plurality of processors all accesses a shared random access data memory. The method further includes setting, by at least one processor within the plurality of processors based upon the composite queue size and respective work queue sizes for each processor within the plurality of processors, a plurality of queue availability flags where each queue availability flag within the plurality of queue availability flags is associated with a respective processor within the plurality of processors and is stored in the shared random access data memory. Each queue availability flag is able to have a first state indicating availability to accept new tasks and a second state indicating an unavailability to accept new tasks. The method also includes placing, by a second processor within the plurality of processors in response to identifying a selected queue availability flag in the first state, a task in a selected work queue where the selected work queue is associated with a selected processor and the selected processor is associated with the selected queue availability flag.

In another embodiment, an information processing system for dispatching tasks to processors sharing a shared memory system within a multiple processor system includes a plurality of processors and a shared random access data memory communicatively coupled to the plurality of processors. The system also includes a composite queue size processor operating on a first processor within the plurality of processors and adapted to determine a composite queue size for a plurality of work queues where each work queue within the plurality of work queues is associated with a respective processor within the plurality of processors. The system further includes a task distribution processor operating on at least one processor within the plurality of processors and adapted to set, based upon the composite queue size and respective work queue sizes for each processor within the plurality of processors, a plurality of queue availability flags. Each queue availability flag within the plurality of queue availability flags is associated with a respective processor within the plurality of processors and is stored in the shared random access data memory. Each queue availability flag is able to have a first state indicating availability to accept new tasks and a second state indicating an unavailability to accept new tasks. The task distribution processor is further adapted to place, in response to identifying a selected queue availability flag in the first state, a task in a selected work queue where the selected work queue is associated with a selected processor and the selected processor is associated with the selected queue availability flag.

In another embodiment, a computer program product for dispatching tasks to processors sharing a shared memory system within a multiple processor system includes a computer readable storage medium having computer readable program code embodied therewith. The computer readable program code includes computer readable program code configured to determine, by a first processor within a plurality of processors, a composite queue size for a plurality of work queues, each work queue within the plurality of work queues being associated with a respective processor within the plurality of processors. The plurality of processors all accesses a shared random access data memory. The computer readable program code also includes computer readable program code configured to set, by at least one processor within the plurality of processors based upon the composite queue size and respective work queue sizes for each processor within the plurality of processors, a plurality of queue availability flags. Each queue availability flag within the plurality of queue availability flags is associated with a respective processor within the plurality of processors and is stored in the shared random access data memory. Each queue availability flag is able to have a first state indicating availability to accept new tasks and a second state indicating an unavailability to accept new tasks. The computer readable program code further includes computer readable program code configured to place, by a second processor within the plurality of processors in response to identifying a selected queue availability flag in the first state, a task in a selected work queue. The selected work queue is associated with a selected processor and the selected processor is associated with the selected queue availability flag.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
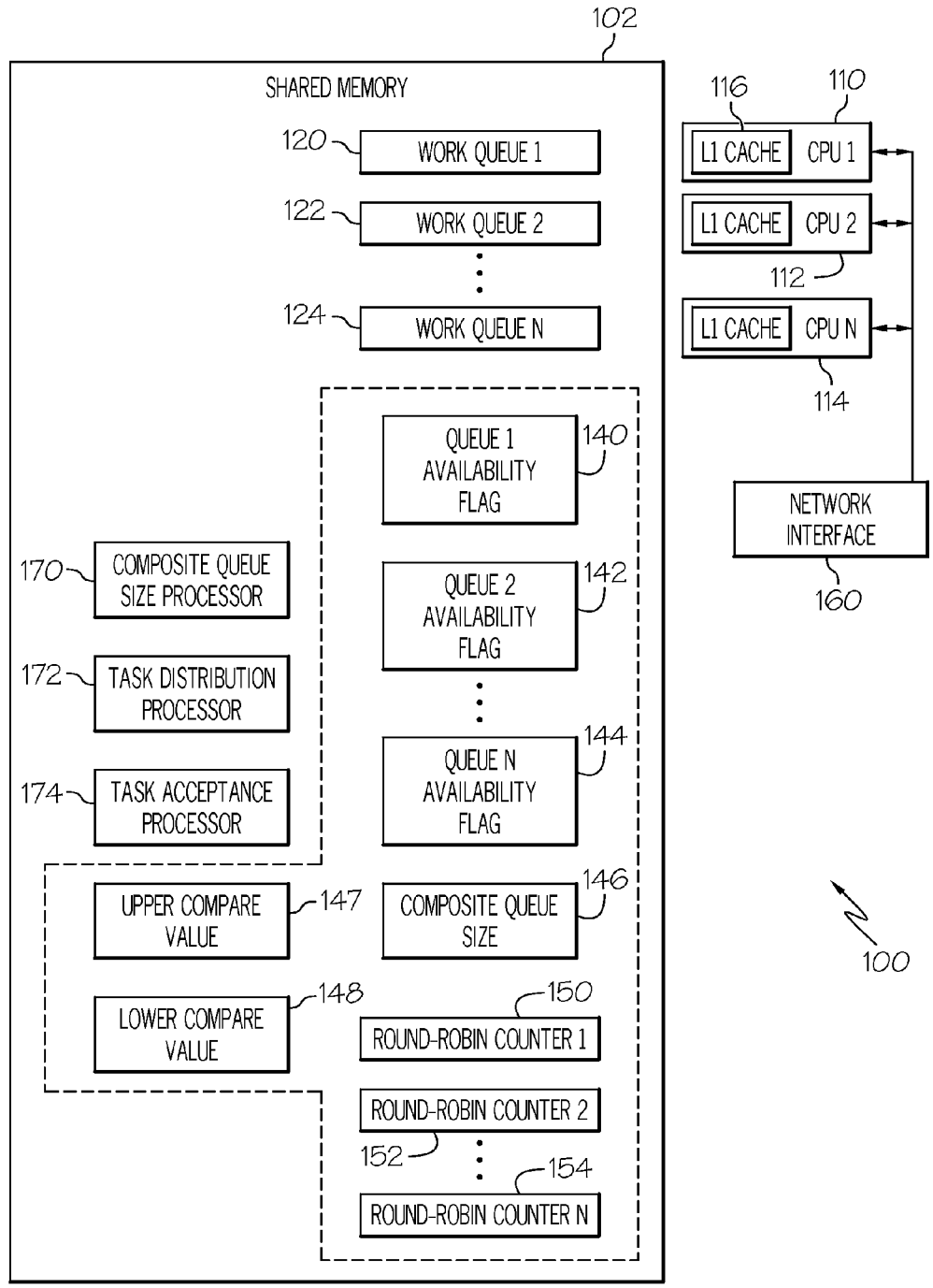
FIG. 1 is a block diagram illustrating a shared memory multiple processor system according to one embodiment of the present invention.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Also, the terms "node" and "vertex" and their derivatives are used interchangeably throughout the following discussion.

Presented is an algorithm for distributing tasks in a shared memory multiple processor system. This algorithm organizes the data used to select a processor that is to receive a new task such that valid versions of that data are likely to be more frequently available in each processor's local cache. The presented algorithm reduces the frequency with which task distribution related data is required to be updated in a processor's local cache due to changes of data made by other processors changing that data in the shared memory. The presented algorithm reduces a significant bottleneck encountered with distributing tasks in large, multi-processor systems using shared memory. Embodiments of the present invention are able to increase the number of processors that use shared memory and efficiently distribute tasks to a larger number of processors due to the reduction in local cache updates required in the often frequently executed task distribution process.

The presented algorithm provides many advantages to allow more efficient implementation of task distribution processing. For example, the presented algorithm provides the ability to cache and reuse data associated with selecting a CPU to which to assign a task many times before that data is changed. In an example scenario, each CPU of a multiple processor architecture is able to use the cached data, e.g., the below described queue availability flags, upper compare values, and lower compare values, by only reading them a few hundred times before those values are changed, thereby allowing valid copies of those data items to be stored in the local cache of all of the CPUs. In addition, the efficiency of the presented algorithm is not affected by the number of CPUs that are accessing the shared memory of an SMP server, so that as the server grows, i.e., more CPUs are added, the overhead of the task dispatcher associated with updating values stored in shared memory does not grow.

FIG. 1 is a block diagram illustrating a shared memory multiple processor system 100 according to one embodiment of the present invention. The shared memory multiple processor system 100 includes a number of processors, CPU 1 110, CPU 2 112, and CPU N 114, that access a shared memory 102. Each processor has an associated local cache, indicated for CPU 1 110 as a first level L1 cache 116. As is understood by practitioners of ordinary skill in the relevant arts in light of the present discussion, a local cache such as a first level L1 cache 116 stores data that is able to be rapidly accessed by its associate processor, such as CPU 1 110 in the example of the first level L1 cache 116. In a shared memory system such as is illustrated, the processor associated with a local cache is able to directly access data stored within the local cache if the corresponding data within the stored memory 102 has not been changed. In general, data that is only manipulated by one processor is able to be rapidly and directly accessed by an associated processor without incurring the processing overhead of accessing commonly accessed shared memory.

The shared memory 102 includes a number of work queues, such as work queue 1 120, work queue 2 122, and work queue N 124. Each work queue within the shared memory 102 is associated with a respective processor. In the illustrated example, CPU 1 110 is associated with work queue 1 120, CPU 2 112 is associated with work queue 2 122, CPU N 114 is associated with work queue N 124. Each work queue is able to accept tasks that are to be processed by its associated processor. In one embodiment of the present invention, any processor is able to place a task in any work queue, thereby causing the processor associated with that work queue to process that task. In order to simplify the description of the present invention, this discussion refers to one work queue being associated with each processor. It is clear that a number of work queues are able to be associated with each processor, such as a design including different work queues for each processor where each work queue for a processor accepts tasks of different processing priorities to be executed by that processor. The teachings of the present discussion are readily adaptable to such multiple work queue per processor architectures.

The shared memory 102 stores a composite queue size value 146. As is described in further detail below, one embodiment of the present invention iteratively determines the composite queue size value as a mean value of the number of tasks that are in all of the work queues, such as work queue 1 120, work queue 2 122, and work queue 3 124. Further embodiments are able to use any value that represents an average, mean, or any quantity reflective of the number of tasks assigned to the work queues of the multiple processor computing system. Further embodiments are also able to determine sizes of work queues, upon which the composite queue size is based, by weighing tasks within the work queues according to suitable quantities, such as an estimated amount of resources that will be required by that task. In one embodiment, the composite queue size is iteratively determined, and therefore updated, at time intervals that are much longer than the anticipated period of distributing tasks to the processors. As such, the value stored in shared memory 102 for the composite queue size 146 will often be stored in the local cache of each processor and will therefore often be accessible to each processor without the processing overhead of general shared memory access. As is further described below, one embodiment defines an upper compare value 147 and a lower compare value 148. These values are computed and stored in shared memory in one embodiment in conjunction with the calculation of the composite queue size.

The shared memory 102 further stores a number of queue availability flags, such as queue 1 availability flag 140, queue 2 availability flag 142, and queue N availability flag 144. Each queue availability flag in one embodiment is associated with a respective work queue and indicates an ability the associated work queue to accept a new task. In one embodiment, each queue availability flag is assigned one of two values. A first value is referred to as "green" and indicates that the associated work queue is available to accept a task. A second value is referred to as "red" and indicates that the associated work queue is unavailable to accept a task. In one embodiment, the determination that a particular work queue is able to accept a new task is based upon a comparison of a value related to the composite queue size 146 to the size of the particular work queue. Various embodiments of the present invention are able to use different values for the size of a particular work queue, such as a raw count of entries in the work queue, a weighted count of entries where each entry is weighted by an estimated amount of resources expected to be consumed by the entry, and similar values.

In one embodiment, each queue availability flag, such as the queue 1 availability flag 140, the queue 2 availability flag 142, and the queue N availability flag 144 are each stored in a separate cache line. As is understood by practitioners of ordinary skill in the relevant arts in light of the present discussion, increasing the amount of time that valid queue availability flag data is stored in each processors local cache is improved by storing each processor's queue availability flag in a separate section of memory such that updating one CPU's queue availability flag does not invalidate the value of other CPUs' queue availability flags that are stored in the local caches of the multiple processors. In an example of processors using a memory cache line of 256 bytes, groups of 256 bytes are stored in the memory caches, (such as the L1 cache of CPU's 110). If CPU 1 has 256 bytes in its L1 cache and then another CPU updates any of those 256 bytes, all 256 bytes are removed from CPU 1's L1 cache. The operation of one embodiment of the present invention does not flush other queue availability flags, such as queue 2 availability flag 142, when one of the processor availability flags, such as queue 1 availability flag 140, is updated. One embodiment therefore stores the availability queue availability flag for each CPU in its own memory cache line, e.g., it resides in its own 256-byte area.

The present discussion describes the queue availability flags as indicating an availability or unavailability of a work queue to accept new tasks. These terms are used to describe the comparative state of work queues as determined by the below described processing of one embodiment of the present invention. It is clear that although a work queue is indicated as "unavailable" to accept new tasks, it is possible to place new tasks into that work queue. The processing of various embodiments are able to include processing that will place tasks in work queues when the queue availability flag indicates that the work queue is "unavailable," such as to handle a condition when all work queues are indicated as being "unavailable."

The shared memory 102 stores a number of operating programs that are executed by, for example, the CPU 1 110, CPU 2 112, and CPU N 114. Operating programs stored in the stored memory 102 include, for example, a composite size processor program 170, a task distribution processor program 172 and a task acceptance processor program 174. The processing of these operating programs are described in detail below.

The multiple processor computing system 100 creates tasks that are to be assigned to and processed by the multiple processors, such as CPU 1 110, CPU 2 112, and CPU N 114. One source of tasks to be assigned to the various processors is through network messages received from a network interface 160. Various embodiments of a multiple processor computer system 100 process network messages received by network interface 160 either by one dedicated processor or by any of the processors based upon, for example, processing availability.

One embodiment of the present invention allows any processor to place tasks, such as are generated in response to received network messages, in its own work queue or the work queue of any other processor. As described in further detail below, when a particular processor has a task to assign to a processor, that particular processor identifies a queue availability flag that is green. When a green queue availability flag is identified, the particular processor places the task into the work queue associated with the identified green queue availability flag. The particular processor then determines the size of the work queue to which the task was just added and determines if that work queue is unavailable and if the availability of the work queue has changed, the particular processor updates the associated queue availability flag.

A particular processor of one embodiment of the present invention determines the processor to which to assign a new task based in part on a round-robin counter. In such embodiments, shared memory 102 stores a separate round robin counter for each processor. In the illustrated example, shared memory 102 stores a round-robin counter 1 150, a round-robin counter 2 152, and a round-robin counter N 154. Each of these round-robin counters is associated with a respective processor such that, for example, only CPU 1 110 uses round-robin counter 1 150, only CPU 2 112 uses round-robin counter 2 152, and so forth. Such a construction results in the round-robin counter value being stored in the local cache for that processor and, since it is never changed by other processors, the value is never required to be updated in the shared memory 102 and exchanged with other processors. This construction obviates the processing overhead of sharing a common round-robin value through shared memory with multiple processors, as is performed by conventional task distribution architectures.

The first queue availability flag examined by a particular processor is selected in one embodiment by adding one the current value of the round-robin counter associated with that particular processor. That round-robin counter is incremented and queue availability flags associated with the incremented values are examined until a green queue availability flag is found.

Figure 2:
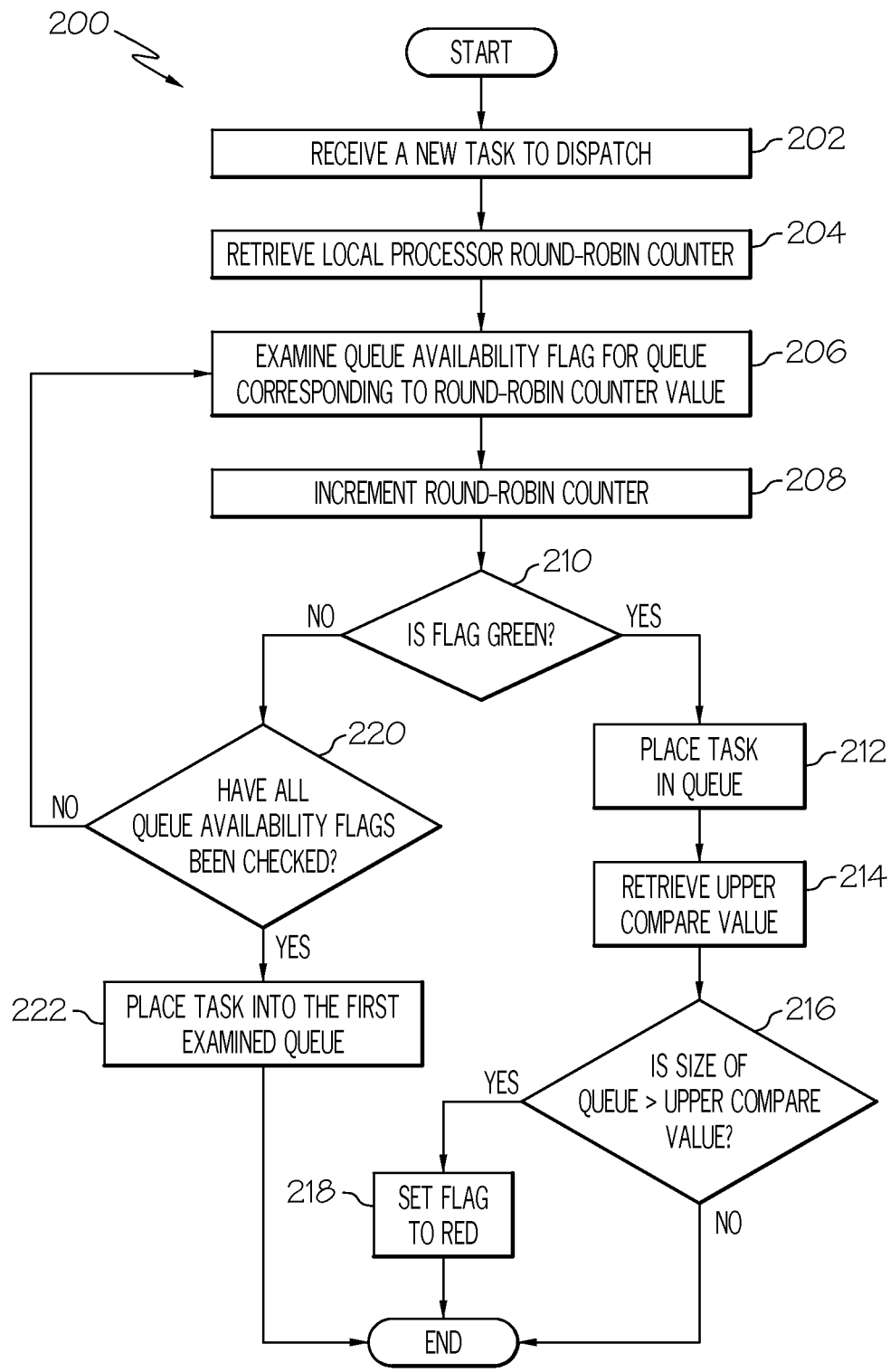
FIG. 2 illustrates a processing flow diagram for dispatching a task to one of a number of processors within a multiple processor system as shown in FIG. 1, according to one embodiment of the present invention.

FIG. 2 illustrates a processing flow diagram for dispatching a task to one of a number of processors within a multiple processor system as is shown in FIG. 1, according to one embodiment of the present invention. The task dispatching processing flow 200 is embodied in one embodiment in a task distribution processor program 172 and is able to be executed by any processor within the multiple processor system 100. The task dispatching processing begins by receiving, at 202, a new task to dispatch. New tasks are able to originate, for example, from a network message received through network interface 160 or are able to be created within a processor within the multiple processor system 100. The processing continues to retrieve, at 204, a local processor round-robin counter associated with the processor executing the task dispatching processing. As described above, one embodiment of the present invention stores in shared memory a separate, local round-robin counter for each processor.

The processing continues by examining, at 206, the queue availability flag for the work queue represented by the value of the local round-robin counter for the processor distributing the task. The processing then increments, at 208, the local round-robin counter for the processor executing the task dispatching processing. In one embodiment, the round-robin counter is incremented "modulo-N" where "N" is the number of processors in the multiple processor architecture. For example, in a system with five (5) processors, once the round-robin counter is equal to five (i.e., indicates the highest number processor), the round-robin counter is "incremented" by resetting its value to the lowest number processor.

The processing determines, at 210, if the examined queue availability flag is "green," thereby indicating the availability of the work queue associated with the examined queue availability flag to accept a task. If the examined queue availability flag is not green, i.e., it is "red" and indicates that the work queue is indicated as unavailable to accept tasks, the processing proceeds to determine, at 220, if all queue availability flags have been checked in this processing to dispatching the new task. If all queues have been checked and the processing has not found any "green" flags, the processing assumes that all flags are "red" and chooses to assign the task to the first queue whose queue availability flag was checked. In one embodiment, if the determination at 220 determines all queue availability flags have not been checked, the processing returns to examining, at 206, the queue availability flag for the next work queue and processing will continue as described above. If all queues have been checked, the processing continues to place, at 222, the task into the queue corresponding to the queue availability flag that was first examined in the first pass through 206.

If the examined queue availability flag was determined to be "green," at 210, the processing proceeds to placing, at 212, the task to the work queue associated with the examined queue availability flag that was green. After the new task is placed in the work queue, the processing of one embodiment retrieves, at 214, the upper compare value 147. The processing of one embodiment uses different queue size thresholds to determine if a work queue is available to accept new tasks, i.e., the queue availability flag should be green, and to determine if the work queue is unavailable to accept new tasks, and therefore the queue availability flag should be "red." In this discussion, the threshold to determine if a work queue is available to accept new tasks, i.e., to determine if the queue availability flag should be changed from red to green, is referred to as a "lower compare value." The threshold to determine if a work queue is unavailable to accept new tasks, i.e., to determine if the queue availability flag should be changed from green to red, is referred to as an "upper compare value." In one embodiment, as is described below, a mean of work queue sizes for all of the work queues associated with each of the CPUs is used as the basis for both compare values and the upper compare value and the lower compare value are computed in conjunction with the determination of the mean work queue size.

In one embodiment, the upper compare value 147 in one example is 25% larger than the mean of work queue sizes for all of the work queues associated with each of the CPUs. The lower compare value 148 is set to the mean of work queue size for all of the work queues associated with each of the CPUs. To illustrate with an example is a case where the mean of work queue sizes for all work queues is 12. The upper compare value 147 in this example is 25% higher than 12, or 16. In this example, the upper compare value 147 is determined by "adjusting" the mean queue size by increasing that value by 25%. This example is clearly just one design choice and further embodiments are able to use various suitable quantities to determine if a work queue is available or unavailable to accept new tasks and various embodiments are able to determine one or both of the upper compare value 147 and the lower compare value 148 by applying an adjustment to a mean queue size, or to any other suitable quantity. Various embodiments are further able to use the mean queue size as one of the upper compare value 147 and the lower compare value 148.

The use of unequal upper compare values 147 and lower compares values 148 reduces the frequency with which the values of those flags will be changed. If the same threshold value were used for both changes of state, the value of the queue availability flag would possibly change each time a task is added or taken from the work queue. This would result in the value of that flag that is in the local caches of other processors to become invalid, and require updating of the other processor's local cache each time that flag is to be updated. Using different values for the upper compare value and lower compare value causes the flag value to be changed much less frequently, and therefore results in valid values being contained in the local caches of all of the multiple processors and greatly reduces the amount of local cache updates required in the course of examining the value of these queue availability flags.

It is to be noted that the upper compare value 147 is only read during this process and not written, thereby preserving the validity of this value in the local caches of other processors. The processing then continues to determine, at 216, if the size of the work queue associated with the examined queue availability flag that was green, i.e., the work queue into which a task was placed at 212, is greater than the upper compare value. If the size of that work queue is larger than the upper compare value, the queue availability flag associated with that work queue is set, at 218, to "red" to indicate that the work queue is not available for accepting new tasks. If that work queue's size is not larger than the upper compare value, the processing ends. It is to be noted that if the size of the work queue does not exceed the upper compare value, i.e., a failure to determine an unavailability of the work queue to accept new tasks, no change is made to the value of the associated queue availability flag as a result of assigning this task to this processor. It is also to be noted that the above described processing will not change the value of the associated queue availability flag since the setting of the flag to "red" at 218 is only reached if the value of the flag was "green," as determined at 210. One embodiment operates to only "set" if the value is changed from green to red so as to not invalidate that value in the local cache memory of other processors. It is to be noted that embodiments of the present invention operate to only "set" the value of the queue availability flag when its value is to be changed and no "setting" operation is performed when the value is not to be changed to preclude invalidating the value of the queue availability flag in the local cache memory of other processors. In other words, if the value of the queue availability flag is already "red," the processing will not again set that value to "red." As a result of not modifying this value, other processors that had previously accessed this queue availability flag and have its value in their local cache are able to continue to use the locally cached value without triggering updates of their local caches through the shared memory access processing. This operation reduces the congestion that occurs in updating local caches through shared memory processing and increases throughput of a multiple processor system using shared memory, particularly as the number of processors sharing a shared memory structure becomes large.

Figure 3:
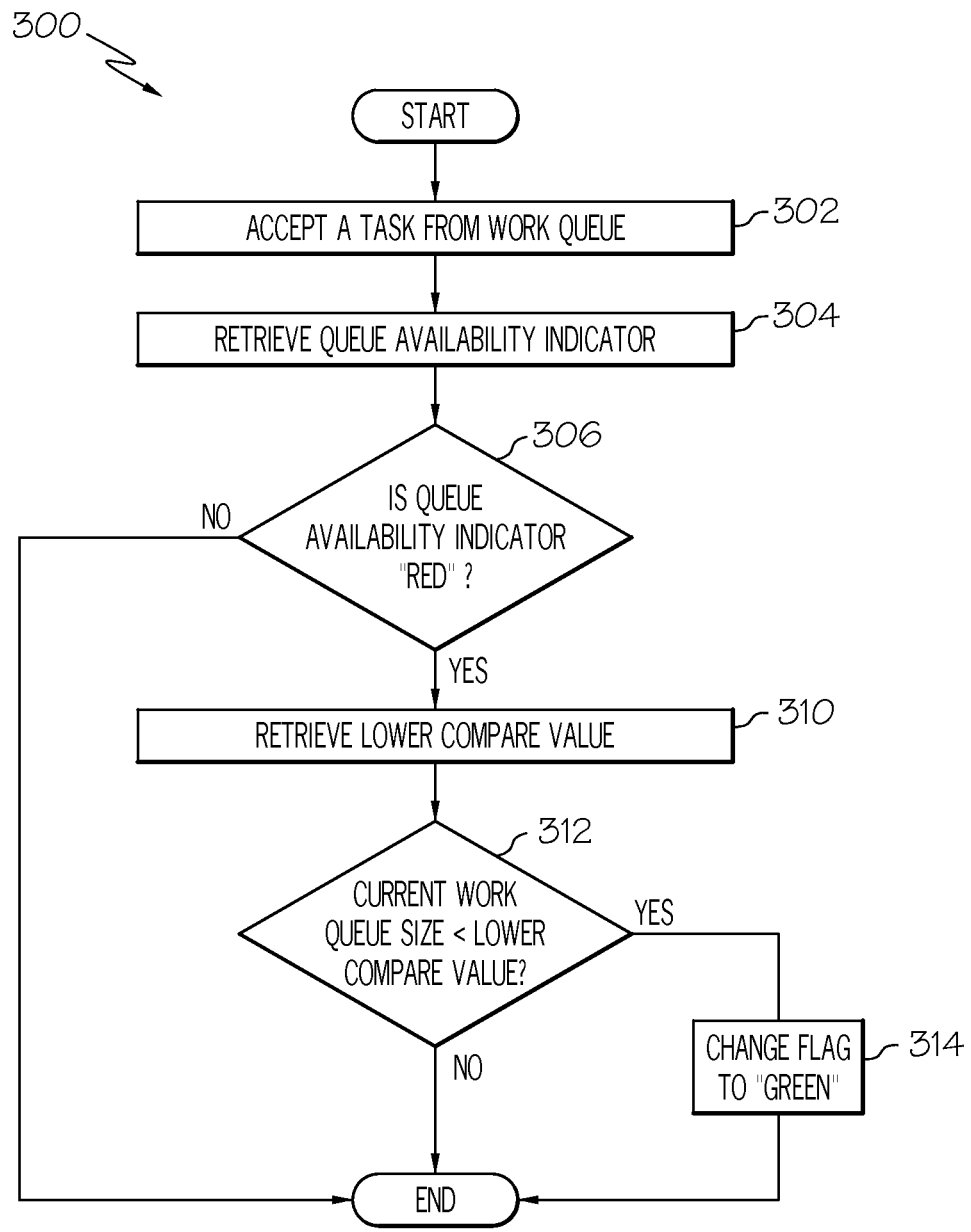
FIG. 3 illustrates a processing flow diagram for accepting a task from a processor associated work queue as shown in FIG. 1, according to one embodiment of the present invention.

FIG. 3 illustrates a processing flow diagram for accepting a task from a processor associated queue process 300 in a multiple processor system using shared memory 100 as shown in FIG. 1, according to one embodiment of the present invention. The accepting a task from a processor associated queue process 300 is embodied in one embodiment in a task acceptance processor program 174 and is executed by any processor within the multiple processors of a multiple processing system using shared memory, such as any of CPU 1 110, CPU 2 112 or CPU N 114 as described above. The processor executing the accepting a task from a processor associated queue 300 accepts, at 302, a task from its associated work queue, which in one embodiment is maintained in shared memory 102. In general, as is understood by practitioners of ordinary skill in the art in light of the present discussion, a particular CPU has associated processing to determine when a new task is to be accepted from its associated work queue and therefore when to begin this processing. The processing continues by retrieving, at 304, the queue availability flag from shared memory for the work queue associated with the processor performing this processing.

The processing proceeds to determine if the queue availability flag for this processor should change state based upon having the queued task removed. The processing determines, at 306, if the queue availability flag for the processor performing this processing is "red," and therefore indicates that the work queue is unavailable to accept new tasks. If the queue availability flag is not "red," no change of state of the queue availability flag is required and the processing terminates.

If the queue availability flag is "red," the processing retrieves the lower compare value 148, at 310 from shared memory 102. In one embodiment, the mean queue size for all work queues is used as the lower compare value 148. Computation of the lower compare value 148 in one embodiment is described below. Further embodiments are able to adjust the composite queue size 146 by any suitable method to derive a lower compare value. It is to be noted that the lower compare value 148 is only read during this process and not written, thereby preserving the validity of this value in the local caches of other processors. The processing then determines, at 312, if the current work queue size for the processor performing this processing is lower than the determined lower compare value. If the current work queue size is lower than the lower compare value, the processing changes, at 314, the queue availability flag from "red" to "green" to indicate that the work queue is able to accept new tasks. If the current work queue size is not lower than the lower compare value, the processing ends. It is to be noted that embodiments of the present invention operate to only "set" the value of the queue availability flag when its value is to be changed and no "setting" operation is performed when the value is not to be changed to preclude invalidating the value of the queue availability flag in the local cache memory of other processors. In other words, if the value of the queue availability flag is already "green," the processing will not again set that value to "green." It is to be noted that the value of the queue availability flag is only changed when required, and as discussed above values of this flag contained in the local cache of other processors will not be affected unless the determined ability of this work queue to accept tasks changes.

Figure 4:
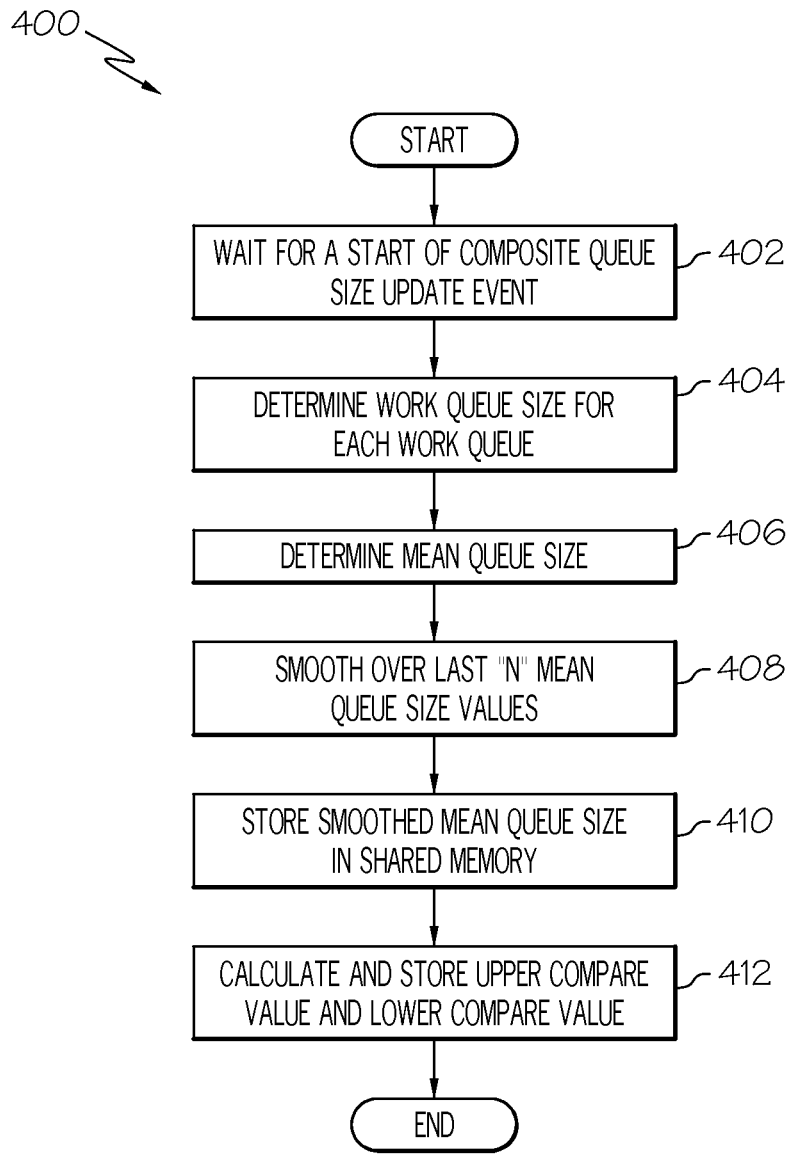
FIG. 4 is a processing flow diagram for updating a composite queue size for a multiple processor system as shown in FIG. 1, according to one embodiment of the present invention.

FIG. 4 is a processing flow diagram for updating a composite queue size 400 for a multiple processor system 100 as shown in FIG. 1, according to one embodiment of the present invention. In various embodiments of the present invention, the updating a composite queue size 400 is embodied in, for example, the composite queue size processor program 170 and is able to be performed by any processor within the multiple processors of a multiple processing system using shared memory, such as any of CPU 1 110, CPU 2 112 or CPU N 114 as described above. Various embodiments are able to, for example, configure one processor to always perform this processing, or the various iterations are able to be performed by various processors. In general, the updating a composite queue size 400 is performed iteratively by one processor at each iteration.

The updating a composite queue size 400 begins by waiting, at 402, for a start of composite queue size update event. Various embodiments of the present invention utilize different techniques to initiate each iteration of the updating a composite queue size 400. For example, one embodiment is able to use a processor's timing architecture to trigger iterations at a fixed or changing time interval. In one embodiment, a processor's timing interrupt is used to trigger processing at 50 mS intervals, resulting in the execution of the updating a composite queue size process 400 twenty times per second.

Once the start composite queue size update event occurs, the processing determines, at 404, the work queue size for each work queue associated with the multiple processors, such as the size of work queue 1 120, work queue 2 122, and work queue N 124. Multiple processor systems generally have established processing procedures to determine the size of each work queue. As discussed above, the "size" of a work queue is able to be based on any suitable measure, such as a raw count or tasks in the work queue or a weighted count based upon estimated resource requirements for each task.

The processing of one embodiment then determines, at 406, a mean work queue size that is equal to the mean of the sizes of all of the work queues as determined at 404. Other suitable quantities are alternatively able to be determined at this stage. The processing then smoothes, at 408, the mean work queue size over the last "N" mean queue size values. In one embodiment, a moving window average of the last "N" determined mean queue sizes, as determined during the last N iterations of the updating a composite queue size process 400, is used. The value of "N" is able to be chosen to be any practical value, such as 20. The smoothed mean work queue size is then stored, at 410, into the shared memory 102 as the composite queue size 146. The processing then calculates, and stores, at 412, the upper compare value 147 and lower compare value 148 into shared memory. It is to be noted that the upper compare value 147 and the lower compare value 148 are only written in during this process, and therefore are read-only fur the above described processing depicted in FIGS. 2 and 3. The processing then returns to wait, at 402, for the start composite queue size update event to occur and start a next iteration of the above described processing.

The above described algorithm uses one queue availability flag for each work queue stored in shared memory 102. Alternative embodiments are able to utilize two queue availability flags for each work queue, a local queue availability flag and an external queue availability flag. Architectures that use two queue availability flags for each work queue are described in further detail in U.S. patent application Ser. No. 12/569,554, which is commonly assigned and filed on even date with the present application. The entire teachings and contents of U.S. patent application Ser. No. 12/569,554 are hereby incorporated herein by reference. Architectures that use two queue availability flags for each work queue use the above described algorithm when accessing work queue data for processors other than the processor performing the task distribution and to maintain the external queue availability flag when a processor is accepting a new task from its queue.

Information Processing System

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
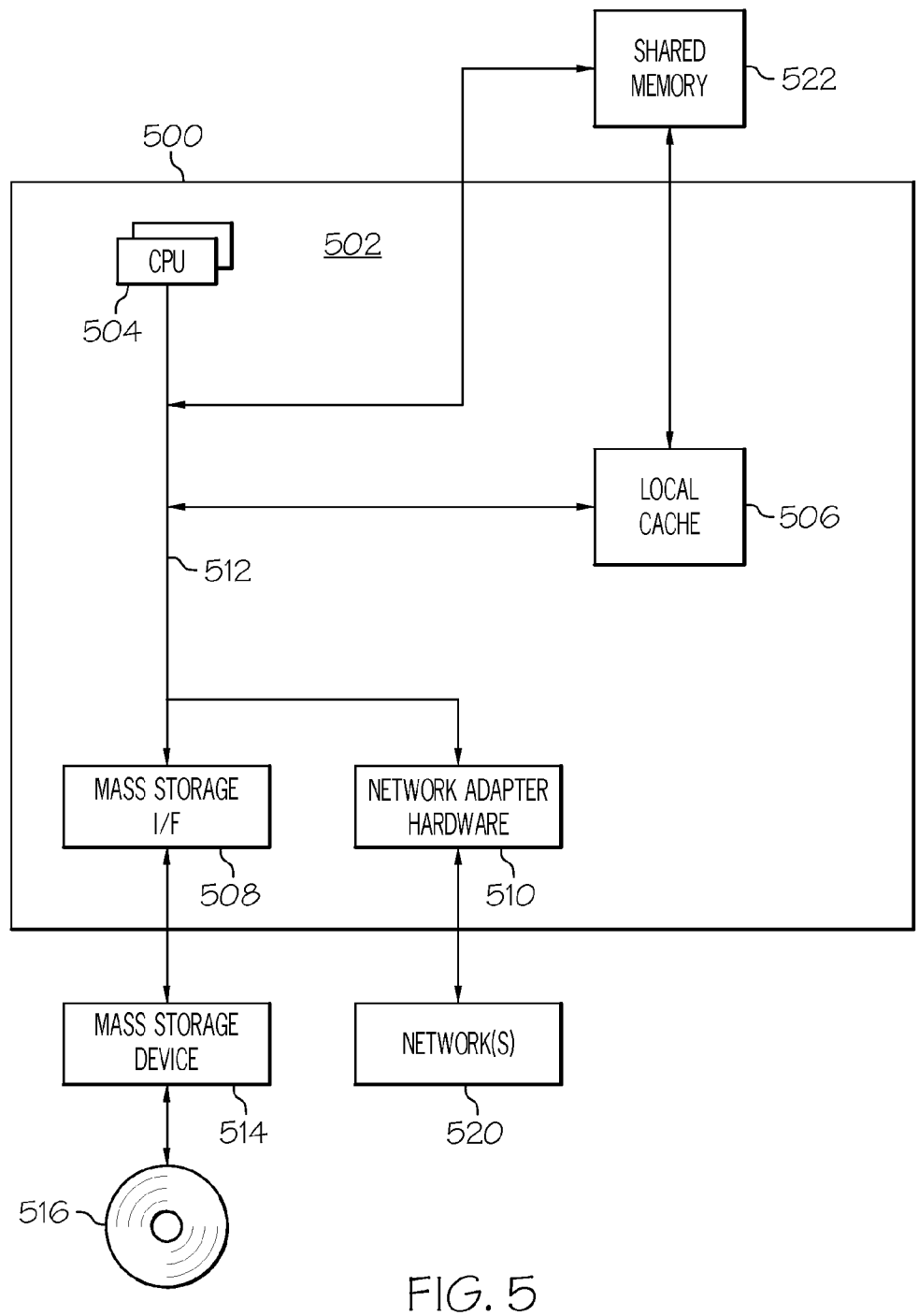
FIG. 5 is a block diagram illustrating an information processing system according to one embodiment of the present invention.

Referring now to FIG. 5, which is a block diagram illustrating an information processing system 500 that can be utilized in the operating environment 100 discussed above with respect to FIG. 1. The information processing system 500 is based upon a suitably configured processing system adapted to implement one or more embodiments of the present invention. Similarly, any suitably configured processing system can be used as the information processing system 500 by embodiments of the present invention.

The information processing system 500 includes a computer 502. The computer 502 has a processor(s) 504 that is connected to a local cache memory 506, shared memory 522, mass storage interface 508, and network adapter hardware 510. A system bus 512 interconnects these system components. The shared memory 522, in one embodiment, includes the composite queue size processor 170, the task distribution processor 172 and the task acceptance processor 174.

The mass storage interface 508 is used to connect mass storage devices, such as data storage device 514, to the information processing system 500. One specific type of data storage device is an optical drive such as a CD/DVD drive, which may be used to store data to and read data from a computer readable medium or storage product such as (but not limited to) a CD/DVD 516. Another type of data storage device is a data storage device configured to support, for example, NTFS type file system operations.

An operating system (not shown) included in the shared memory 522 is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 500. The network adapter hardware 510 in one embodiment is part of a network interface 160 and provides network communications interfaces to one or more networks 520. Embodiments of the present invention are able to be adapted to work with any data communications connections including present day analog and/or digital techniques or via a future networking mechanism.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for dispatching tasks to processors within a plurality of processors in a multiple processor system, the method comprising:

maintaining a shared random access memory accessible by the plurality of processors, the shared random access memory comprising a respective local cache of each processor within the plurality of processors;

storing, within the shared random access memory, a plurality of queue availability flags, each respective queue availability flag indicating availability of a work queue associated with a respective processor associated with the respective queue availability flag to accept a new task;

maintaining the plurality of queue availability flags within the respective local cache of each processor within the plurality of processors;

determining, by a first processor within the plurality of processors, a composite queue size, wherein the composite queue size is a mean of a total of tasks assigned to a plurality of work queues of the plurality of processors, wherein the queue availability flag for each respective processor is set based upon the composite queue size and a size of the work queue for the respective processor;

determining an upper compare value and a lower compare value based upon the composite queue size, wherein the upper compare value is larger than the composite queue size;

storing, by the first processor, the composite queue size and the upper compare value in the respective local cache of a second processor that is different from the first processor and that is within the plurality of processors;

receiving a task to dispatch;

determining, by a second processor, that a selected queue availability flag of a selected work queue has a first value, wherein the first value indicates an availability to accept new tasks;

placing, by the second processor, the task into the selected work queue;

determining, by the second processor subsequent to the placing the task, that the selected work queue has a size greater than the upper compare value; and writing a second value to the selected queue availability flag the second value indicating an unavailability to accept new tasks.

2. The method of claim 1, wherein the determining the composite queue size for the plurality of work queues is iteratively performed.

3. The method of claim 1, wherein the writing the second value to the selected queue availability flag is further based in part upon a relationship of a size of the selected work queue to one of the upper compare value and the lower compare value, wherein the upper compare value is greater than and different from the lower compare value, the method further comprising storing lower compare value and the upper compare value in the shared random access memory.

4. The method of claim 1, further comprising:
beginning processing, by a selected processor that is associated with the selected work queue, of a task,
based on
determining, in response to the beginning processing, that the selected work queue has a size not less than the lower compare value; and
determining, by the selected processor subsequent to and based on the beginning processing, that the selected queue availability flag has a second value,
writing the first value to the selected queue availability flag.

5. The method of claim 1, wherein the first processor is separate from the second processor.

6. The method of claim 1, wherein the determining the composite queue size occurs at times that are independent of times of placing the task into the selected work queue and independent of times of determining that the selected work queue has a size not greater than the upper compare value, and independent of times of determining that the selected queue availability flag has the first value.

7. The method of claim 6, wherein the determining the composite queue size occurs less frequently than the placing the task into the selected work queue.

8. The method of claim 1, wherein a new upper compare value is determined in conjunction with and based one each iteration of determining the composite queue size.

9. A system for dispatching tasks to processors within a multiple processor system, the system comprising:
a plurality of processors;
a shared random access data memory communicatively coupled to the plurality of processors, the shared random access memory comprising a respective local cache of each processor within the plurality of processors;
a composite queue size processor operating on a first processor within the plurality of processors and configured to determine a composite queue size, wherein the composite queue size is a mean of a total of tasks assigned to a plurality of work queues of the plurality of processors;
a task distribution processor operating on a selected processor within the plurality of processors and configured to:
maintain, within the shared random access memory, a plurality of queue availability flags, each queue availability flag indicating availability to accept a new task of a respective associated work queue within a plurality of work queues, wherein the queue availability flag for each respective processor is set based upon the composite queue size and a size of the work queue for the respective processor;
store the plurality of queue availability flags within the respective local cache of each processor within the plurality of processors, wherein each respective queue availability flag indicates ability of a work queue associated with a respective processor associated with the respective queue availability flag to accept a new task;
determine an upper compare value and a lower compare value based upon the composite queue size, where in the upper compare value is larger than the composite queue size;
store, by the first processor, the composite queue size and the upper compare value in the respective local cache of a second processor that is different from the first processor and that is within the plurality of processors;
and
the task distribution processor further comprising a task allocation processor, configured to:
receive a task to dispatch;
determine, by a second processor, that a selected queue availability flag of a selected work queue has a first value, wherein the first value indicates an availability to accept new tasks;
place, by the second processor, the task into the selected work queue;
the task distribution processor being further configured to:
determine, by the second processor subsequent to a placing of the task, that the selected work queue has a size greater than the upper compare value; and
write a second value to the selected queue availability flag, the second value being different than the first value, the second value indicating an unavailability to accept new tasks.

10. The system of claim 9, wherein the composite queue size processor iteratively determines the composite queue size for the plurality of work queues.

11. The system of claim 9, wherein the task distribution processor is capable of writing the second value to the selected queue availability flag is further based in part upon a relationship of a size of the selected work queue to one of the upper compare value and the lower compare value,
wherein the upper compare value is greater than and different from the lower compare value,
wherein the task distribution processor is further capable of storing at least one of the lower compare value and the upper compare value in the shared random access memory.

12. The system of claim 9, the task distribution processor further configured to:
beginning processing, by a selected processor that is associated with the selected work queue, of a task,
writing the first value to the selected queue availability flag based on
determining, in response to the beginning processing, that the selected work queue has a size not less than the lower compare value; and
determining, in response to the beginning processing, that the selected queue availability flag has a second value.

13. A computer program product for dispatching tasks to processors within a plurality of processors of a multiple processor system, the computer program product comprising:
a non-transitory computer readable storage device having computer readable program code embodied therewith, the computer readable program code comprising:
computer readable program code configured to maintain, a shared random access memory accessible by a plurality of processors, the shared random access memory comprising a respective local cache of each processor within the plurality of processors;
computer readable program code configured to store, within the shared random access memory, a plurality of queue availability flags, each respective queue availability flag indicating availability of a work queue associated with a respective processor associated with the respective queue availability flag to accept a new task;

computer readable program code configured to maintain the plurality of queue availability flags within the respective local cache of each processor within the plurality of processors;

computer readable program code configured to determine, by a first processor within the plurality of processors, a composite queue size, wherein the composite queue size is one of an average of a total of tasks assigned to a plurality of work queues and a mean of a total of tasks assigned to the plurality of work queues of the plurality of processors, wherein the queue availability flag for each respective processor is set based upon the composite queue size and a size of the work queue for the respective processor;

computer readable program code configured to determine an upper compare value and a lower compare value based upon the composite queue size, wherein the upper compare value is larger than the composite queue size;

computer readable program code configured to store, by the first processor, the composite queue size and the upper compare value in the respective local cache of a second processor that is different from the first processor and that is within the plurality of processors;

computer readable program code configured to receive a task to dispatch;

computer readable program code configured to determine, by the second processor, that a selected queue availability flag of a selected work queue has a first value, wherein the first value indicates an availability to accept new tasks;

computer readable program code configured to place, by the second processor the task into the selected work queue;

computer readable program code configured to determine, by the second processor subsequent to the placing the task, that the selected work queue has a size greater than the upper compare value; and computer readable program code configured to write a second value to the selected queue availability flag, the second value indicating an unavailability to accept new tasks.

14. The computer program product of claim 13, wherein the computer readable program code configured to write the second value to the selected queue availability flag further based in part upon a relationship of a size of the selected work queue to one of the upper compare value and the lower compare value, wherein the upper compare value is greater than and different from the lower compare value, the computer readable program code further comprising:

computer readable program code configured to store the lower compare value and the upper compare value in the shared random access memory.

15. The computer program product of claim 13, the computer readable program code further comprising:

computer readable program code configured to begin processing, by a selected processor that is associated with the selected work queue, of a task, wherein computer readable program code further comprises computer readable program code configured to:

based on determining, by the selected processor subsequent to and based on the beginning processing, that the selected work queue has a size not less than the lower compare value; and determining, in response to the beginning processing, that the selected queue availability flag has a second value, write the first value to the selected queue availability flag.

* * * * *